US012437875B1

(12) United States Patent
Culbertson, II et al.

(10) Patent No.: US 12,437,875 B1
(45) Date of Patent: Oct. 7, 2025

(54) HEALTH MANAGEMENT BASED ON CONDITIONS AT A USER'S RESIDENCE

(71) Applicant: United Services Automobile Association (USAA), San Antonio, TX (US)

(72) Inventors: William Preston Culbertson, II, Plant City, FL (US); Gregory David Hansen, San Antonio, TX (US); Mark Anthony Lopez, Helotes, TX (US); Will Kerns Maney, San Antonio, TX (US); Keegan Patrick Hayes, San Antonio, TX (US); Steven Michael Bernstein, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 549 days.

(21) Appl. No.: 17/463,169

(22) Filed: Aug. 31, 2021

(51) Int. Cl.
*G16H 50/30* (2018.01)
*G06Q 40/08* (2012.01)

(52) U.S. Cl.
CPC .............. *G16H 50/30* (2018.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 10,353,359 B1* | 7/2019 | Jordan, II | ............. | G01C 21/20 |
| 10,713,726 B1* | 7/2020 | Allen | .................... | G06Q 40/08 |
| 11,792,175 B1* | 10/2023 | Nodder | ............... | H04L 63/1433 |
| | | | | 726/7 |
| 2006/0263750 A1* | 11/2006 | Gordon | .................. | G16H 20/60 |
| | | | | 434/127 |
| 2013/0109342 A1* | 5/2013 | Welch | .................... | G08B 21/22 |
| | | | | 455/404.2 |
| 2013/0332023 A1* | 12/2013 | Bertosa | .................. | G07C 5/006 |
| | | | | 701/29.4 |
| 2015/0077737 A1* | 3/2015 | Belinsky | ............ | G01N 15/0211 |
| | | | | 250/208.2 |
| 2015/0242590 A1* | 8/2015 | Taylor | .................... | G16H 10/60 |
| | | | | 705/2 |
| 2016/0071219 A1* | 3/2016 | Joshi | .................. | G06Q 30/0269 |
| | | | | 705/4 |
| 2017/0001831 A1* | 1/2017 | Cui | ....................... | B66B 5/0018 |
| 2017/0139386 A1* | 5/2017 | Pillai | .................... | H05B 47/175 |
| 2017/0311053 A1* | 10/2017 | Ganjam | ................. | G06V 20/20 |
| 2018/0217660 A1* | 8/2018 | Dayal | .................... | G06N 20/00 |

(Continued)

OTHER PUBLICATIONS

Leslie Bodge, "Insurance for Unmarried Couples and Other Folks Who Live Together", Jan. 27, 2021 (Year: 2021).*

*Primary Examiner* — Mamon Obeid
*Assistant Examiner* — Andrew Kyle Tapia
(74) *Attorney, Agent, or Firm* — Fletcher Yoder, PC

(57) ABSTRACT

A health management system includes one or more processors configured to receive sensor data from one or more sensors disposed at a residence of a user. The sensor data is indicative of one or more conditions at the residence. The one or more processors are configured to determine a health of the user based on the one or more conditions, determine one or more actions configured to improve the health of the user based on the one or more conditions, and provide, via a device of the user, a notification indicative of the one or more actions.

20 Claims, 6 Drawing Sheets

(56) References Cited

U.S. PATENT DOCUMENTS

| | | | |
|---|---|---|---|
| 2020/0200416 A1* | 6/2020 | Granger | G16H 40/67 |
| 2020/0226892 A1* | 7/2020 | Coles | G08B 5/38 |
| 2021/0010315 A1* | 1/2021 | Honjo | E05F 15/71 |
| 2021/0016686 A1* | 1/2021 | Yetukuri | B60N 2/0022 |

* cited by examiner

HEALTH MANAGEMENT BASED ON CONDITIONS AT A USER'S RESIDENCE

BACKGROUND

Conditions in a building may affect an occupant's health. For example, a gas leak may cause the occupant to become ill, or a general cleanliness of the building may affect the occupant's health. In some situations, the occupant may be unaware of certain conditions in the building, such as an air quality in the building, and corresponding health effects. Additionally, insurance costs for the occupant typically remain static even as conditions in the building change, such that the insurance costs do not reflect or account for possible changes to the occupant's health due to the conditions in the building.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a health management system includes one or more processors configured to receive sensor data from one or more sensors disposed at a residence of a user. The sensor data is indicative of one or more conditions at the residence. The one or more processors are configured to determine a health of the user based on the one or more conditions, determine one or more actions configured to improve the health of the user based on the one or more conditions, and provide, via a device of the user, a notification indicative of the one or more actions.

In certain embodiments, a health management system includes one or more processors configured to receive sensor data from one or more sensors disposed at a residence of a user. The sensor data is indicative of one or more conditions at the residence. The one or more processors are configured to receive an indication of a user request for a temporary residence different from the residence, determine a recommendation of one or more temporary residences based on the one or more conditions at the residence, and provide, via a device of the user, a notification indicative of the recommendation.

In certain embodiments, a health management system includes one or more processors configured to receive sensor data from one or more sensors disposed at a residence of a user. The sensor data is indicative of one or more conditions at the residence. The one or more processors are configured to determine a configuration of the residence based on the one or more conditions, determine a health of the user based on the configuration, determine one or more modifications to the configuration that are configured to improve the health of the user, and provide, via a device of the user, a notification indicative of the one or more modifications to the configuration.

BRIEF DESCRIPTION OF THE DRAWINGS

Various aspects of this disclosure may be better understood upon reading the following detailed description and upon reference to the drawings in which.

DETAILED DESCRIPTION

Figure 1:
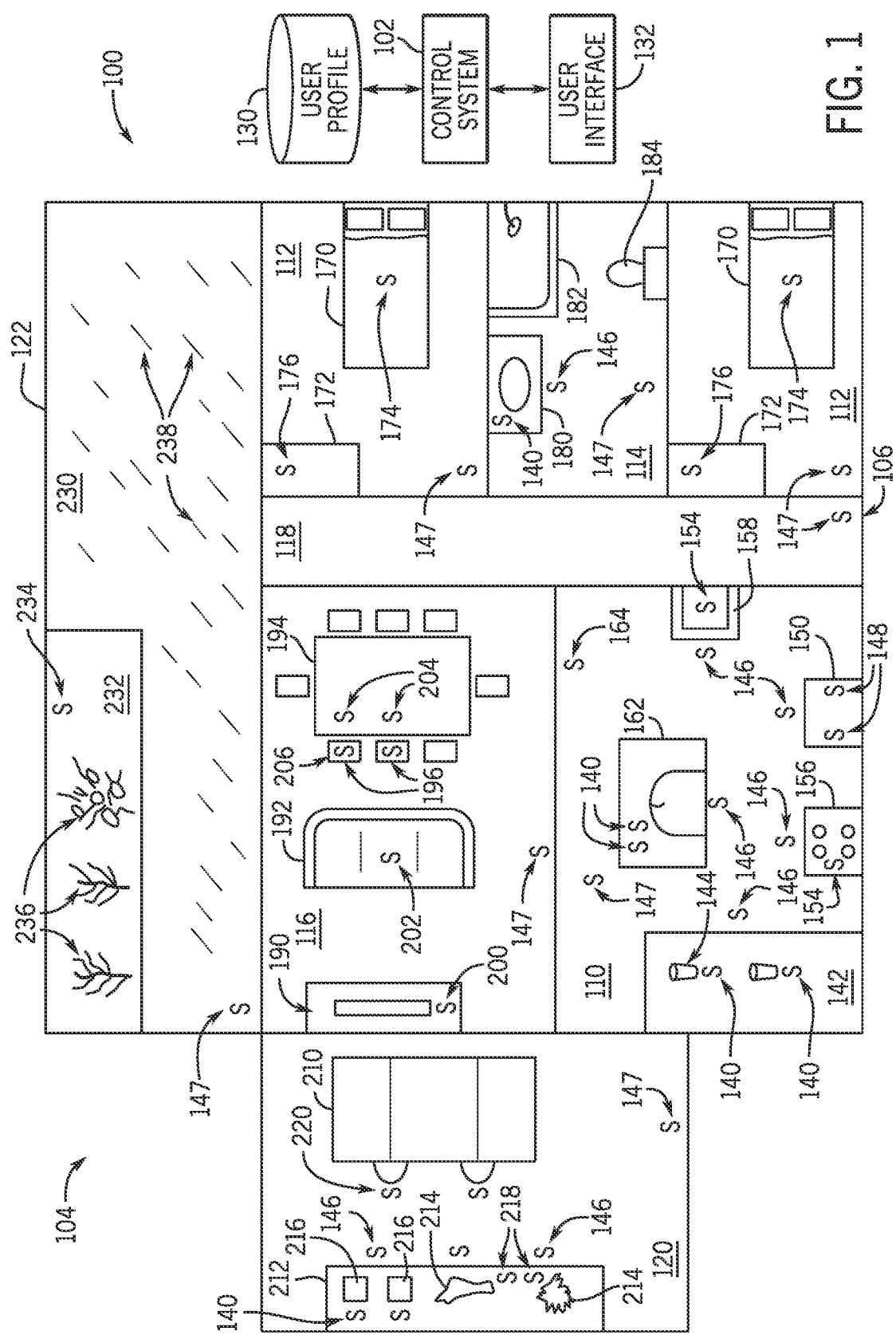
FIG. 1 illustrates a schematic diagram of a health management system including a control system configured to improve a user's health based on conditions in a residence of the user, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to a health management system configured to improve a user's health based on conditions (e.g., sensor data indicative of the conditions) at a residence of the user. More specifically, the health management system may monitor conditions at the residence and determine actions, recommendations, and/or modifications configured to improve the user's health based on the conditions. In response to an action being performed, a recommendation being selected, and/or a modification being completed, the health management system may determine an improvement to the user's health. Based on the improvement, the health management system may adjust costs associated with the user's health and/or the residence, such as by decreasing an insurance cost (e.g., insurance premium and/or insurance deductible). Accordingly, the health management system may promote healthy behavior by the user, facilitate a healthy lifestyle, and provide financial benefits for the healthy behavior.

In certain embodiments, the health management system may determine actions configured to improve the user's health based on the conditions at the residence and notify the user of the actions, thereby enabling the user to perform the actions and improve their health. In some instances, the health management may automatically perform the actions without input from the user and/or may notify the user that the actions will be performed or have been performed. For example, the conditions at the residence may indicate amounts of food consumed by the user over time, and the actions may include increasing or decreasing certain types of food to improve the health of the user. In another example, the conditions at the residence may indicate locations and amounts of cleaning supplies, as well as an identity of the user accessing the cleaning supplies. The health management system may determine that actions including moving the cleaning supplies, locking a cabinet containing the cleaning supplies, and/or reordering the cleaning supplies may improve the health of the user, such as by decreasing a stress level of the user and/or substantially preventing the user from consuming the cleaning supplies. Accordingly, the health management system may notify the user of the actions and/or automatically perform the actions.

In certain embodiments, the health management system may receive an indication of a user request for a temporary residence (e.g., vacation home) different from their residence (e.g., primary or main home). The health management system may determine a recommendation of a temporary residence or of multiple temporary residences based on the conditions at the user's primary residence. For example, the conditions at the user's primary residence may indicate preferences of the user that facilitate sleep of the user (e.g., a bed type, a bed firmness, a noise level) and/or may indicate certain foods, recreational equipment, and other household items disposed at the user's primary residence. The conditions may generally promote a healthy lifestyle for the user, such as by facilitating sleep of the user. The health management system may determine potential temporary residences having the same and/or similar conditions as the primary residence. For example, the health management system may select, from a larger pool of available temporary residences, potential temporary residences that include the same bed type and bed firmness as the bed at the user's primary residence. In some embodiments, the health management system may determine potential temporary residences having additional health benefits for the user, such as recreational equipment configured to improve the user's health. After determining the temporary residences, the health management system may automatically book one of the temporary residences for the user or may notify the user of the temporary residences, thereby enabling the user to select one of the temporary residences.

In certain embodiments, the health management system may determine a configuration of the residence of the user based on the conditions at the residence and modifications to the configuration configured to improve the user's health. For example, the health management system may determine that an appliance is broken and/or that an outdoor area has not been maintained. Modifications configured to the improve the user's health may include a maintenance operation of the appliance and/or maintaining the outdoor area (e.g., mowing a lawn). The health management system may determine the modifications, automatically implement the modifications (e.g., automatically repair or schedule a repair of the appliance, automatically mow the lawn), and/or may notify the user of the modifications, thereby enabling the user to implement the modifications.

With the foregoing in mind, FIG. 1 illustrates a block diagram of a health management system 100 including a control system 102 (e.g., an electronic controller) that may receive an indication of conditions at a residence 104 and determine actions, recommendations, and/or modifications configured to improve a health of a user (e.g., an occupant of the residence 104, an owner of the residence 104, a renter of the residence 104). The residence 104 may be a home, apartment, business, or other suitable structure. Additionally, the health management system 100 includes sensors 106 (e.g., a sensor system) disposed in and around the residence 104. To facilitate discussion and image clarity, the sensors 106 as a group are identified with one arrow in FIG. 1, while individual sensors are also labeled with "S" in FIG. 1. As shown, the sensors 106 are disposed at a kitchen 110, bedrooms 112, a bathroom 114, a living room 116, a hallway 118, a garage 120, and an outdoor area 122 (e.g., a lawn, a garden) of the residence 104. The sensors 106 are configured to provide sensor data indicative of conditions at the residence 104 to the control system 102 (e.g., the sensors 106 are communicatively coupled to the control system 102 via wired and/or wireless connections). For example, the sensors 106 may measure certain parameters, capture images, and obtain other data.

The control system 102 may make determinations to improve the health of the user based on the sensor data received from the sensors 106. For example, the control system 102 may determine actions configured to improve the user's health and may automatically perform the actions and/or may notify the user of the actions. Additionally, the control system 102 may receive additional sensor data (e.g., sensor data received subsequent to the performing the actions or notifying the user of the actions) indicative of an update to the conditions at the residence 104 and may determine an improvement to the health of the user based on the update. Based on the improvement, the control system 102 may determine a decrease to an insurance cost associated with the user, such as an insurance premium and/or an insurance deductible. In some embodiments, the control system 102 may determine that the user's health has deteriorated based on the update to the conditions at the residence 104 and may determine an increase or no change to the insurance cost based on the deterioration. The insurance cost may be for an insurance policy associated with the user (e.g., life insurance, disability insurance, health insurance), an insurance policy associated with the residence 104 (e.g., homeowner's insurance, flood insurance, fire insurance), an insurance policy associated with property of the user other than the residence 104, an automobile insurance policy, and/or other suitable insurance policies associated with the user. Generally, as an example, it may be appropriate to adjust the insurance cost for the residence 104 or another insurance policy for the user because the conditions at the residence 104 may reflect the care that the user takes with respect to their property and/or the care that the user takes to provide a healthy, safe environment. It should also be appreciated that the insurance cost may be adjusted for a subsequent policy time period (e.g., for the next year or at the next renewal period) and/or for a current policy time period (e.g., a refund during a current year or month). Furthermore, the insurance cost may be effectively adjusted by providing funds to the user, such as via a deposit of funds to an account of the user, for certain accomplishments related to the health of the user (e.g., for always properly storing cleaning supplies throughout a monitoring time period) and/or for certain events (e.g., for selecting a recommended temporary residence, as discussed herein).

In certain embodiments, the control system 102 may receive a user request for a temporary residence that is different from the residence 104. For example, the user may attempt to find a temporary residence including a hotel room, a vacation rental property, or another temporary residence. The control system 102 may identify or determine temporary residences to recommend to the user based on the conditions at the residence 104. As explained in greater detail below, such conditions at the residence 104 may include a bed type, a bed firmness, a noise level, foods, access to recreational equipment, and/or other suitable conditions. The control system 102 may determine temporary residences having conditions similar to those at the residence 104 and recommend the temporary residences (e.g., at least one temporary residence) to the user, thereby enabling the user to select a particular temporary residence from among the recommended temporary residences. In some embodiments, the control system 102 may automatically book the particular temporary residence independent of an input from the user or may automatically book the particular temporary residence in response to the user selection of the temporary residence. In certain embodiments, the control system 102 may determine temporary residences having conditions other than or in addition to the conditions at the residence 104 that further promote healthy behavior for the user, such as additional access to additional recreational equipment, better sleeping conditions than those at the residence 104, and/or other suitable conditions. This may encourage the user to improve the conditions upon return to the residence 104 and/or may facilitate healthy behavior for at least some period of time.

The control system 102 may determine a decrease to an insurance cost associated with the user in response to a user selection of the particular temporary residence from among the recommended temporary residences. In certain embodiments, the control system 102 may determine an increase to the insurance cost associated with the user in response to the user selecting a temporary residence that was not included in the recommended temporary residences. For example, the control system 102 may determine that the selected temporary residence has conditions that are not conducive to the health of the user and/or that may deteriorate the user's health, such as unfavorable sleeping conditions, no or little recreational equipment, and/or unhealthy food.

In certain embodiments, the control system 102 may determine a configuration of the residence 104 based on the conditions. The configuration may include a general status of certain components disposed at the residence 104, such as appliances, structural features of the residence 104 (e.g., doors, walls, ceilings, floors), light fixtures, furniture, exterior surfaces of the residence 104 (e.g., outside walls, a roof), and other suitable components at the residence 104.

The status of the components included in the configuration may include an age, an amount of wear, a working status (e.g., working efficiently, working inefficiently, broken, repaired), and/or the presence, type, and/or severity of defects. The control system 102 may determine a health of the user based on the configuration, such as a stress level of the user associated with the configuration. For example, a broken appliance or an unkempt lawn of the residence 104 may cause the user to have a relatively high stress level compared to a configuration in which the appliance is not broken and/or the lawn is properly maintained. The control system 102 may determine modifications to the configuration configured to improve the health of the user including repairing the appliance and/or maintaining the lawn. Accordingly, the control system 102 may automatically perform the modifications and/or may notify the user of the notifications, thereby enabling the user to implement the modifications. In response to updated conditions at the residence 104 indicating that the modifications were implemented and/or an improvement to the user's health, the control system 102 may determine a decrease to an insurance cost associated with the user.

In certain embodiments, the control system 102 may determine the health of the user, the actions configured to improve the health of the user, the recommendation of temporary residences, and/or the modifications to the configuration of the residence 104 based on a user profile stored in a user profile database 130. For example, the sensor data received from the sensors 106 may indicate an identify of the user, and/or the control system 102 may identify the user based on the sensor data. Based on the identity, the control system 102 may retrieve a corresponding user profile from the user profile database 130 that indicates certain information about the user, such as age, height, weight, occupation, medical history, insurance policy information, and other suitable information. Certain users, such as users that reside within the residence 104 or one household, may be grouped together and associated with at least some of the same insurance policy information (e.g., each user in the residence 104 may have their own life insurance policy and may share the same homeowner's insurance policy). In certain embodiments, the insurance policy information may include deductible amounts, premium amounts, lengths of the policies, a history of each user's past policies, documented interactions with the users (e.g., interactions to assist the users with their policies), and/or user ratings of various policies. The control system 102 may determine the actions, recommendation, and/or modifications based on the user profile in addition to and/or in place of the conditions at the residence 104. In some embodiments, the health management system 100 may include the user profile database 130.

In certain embodiments, the control system 102 may generate and/or provide a notification (e.g., pop-up window, visual alert, audible alert, physical alert) indicative of the actions configured to improve the health of the user, the recommendation of temporary residences, and/or the modifications to the configuration of the residence 104. For example, the control system 102 may generate and/or provide the notification via a user interface 132 of a device of the user. The notification may include an indication of the actions, recommendation, and/or modifications to facilitate performance of the actions and/or modifications or selection of the particular temporary residence from the recommendation. In some embodiments, the notification may include an indication that the control system 102 has already performed actions and/or modifications or selected the particular temporary residence. In certain embodiments, the control system 102 may generate representations of a graphical user interface and provide the representations (e.g., transmit signals) to the device of the user to display the representations via the user interface 132. Examples of such representations are described below in reference to FIGS. 3 and 4. In some embodiments, the health management system 100 may include the user interface 132 and/or the device of the user having the user interface 132. The user device may be a computer disposed at the residence 104 (e.g., phone, laptop, tablet).

In certain embodiments, the notification provided by the control system 102 may enable the user to interact with the control system 102 and the health management system 100 generally. For example, the user interface 132 may display the notification, thereby allowing the user to view information about the actions configured to improve the health of the user, the recommendation of temporary residences, and/or the modifications to the configuration of the residence 104. The notification may include selectable options, such as options to select a particular action, a particular temporary residence, and/or a particular modification. In some embodiments, the control system 102 may automatically implement the particular action, book particular temporary residence, and/or implement the particular modification in response to receiving the user selection.

In certain embodiments, the notification may display additional information about the conditions at the residence 104 in addition to and/or in place of the actions configured to improve the health of the user, the recommendation of temporary residences, and the modifications to the configuration of the residence 104. For example, the notification may display activity of the user as indicated by the conditions at the residence 104, such as the user's food consumption, recreation, sleep activity, and other activity of the user.

As described above, the sensors 106 are disposed in and around the residence 104 and are configured to measure certain parameters, capture images, and obtain other data. For example, at the kitchen 110, the sensors 106 may include sensors 140 disposed in a pantry 142. The sensors 140 may obtain data indicative of the weights and/or types (e.g., nutrition information, names, brands) of food 144 disposed in the pantry. For example, the sensors 140 may be scales configured to weigh the food 144. In certain embodiments, the user may identify the types of the food 144, such as by providing an input to the user interface 132. The sensors 140 may transmit signals indicative of the weights and/or type of the food 144 to the control system 102. Additionally, the sensors 106 may include a sensor 146 disposed adjacent to the pantry 142 and configured to obtain data indicative of an identity of a user accessing the food 144. For example, the sensor 146 may be a scale configured to weigh the user.

The control system 102 may receive sensor data indicative of the weights and/or types of the food 144 from the sensors 140 and/or sensor data indicative of the identity of the user from the sensor 146 and make determinations based on the sensor data. In some embodiments, the control system 102 may receive sensor data over time and determine changes in the sensor data. For example, the control system 102 may determine that a particular user is accessing the pantry and consuming a particular type and/or amount of the food 144. More specifically, the sensor data may indicate a reduced weight for a particular food 144 while or after the user has accessed the pantry 142. The control system 102 may determine a health of the user based on the sensor data. For example, the health of the user may be affected by the type and/or amount of the food 144 consumed by the user. It should be appreciated that the control system 102 may receive relevant information about the type and/or amount of the food 114 in other ways, such via an input to the user interface 132 (e.g., after each grocery shopping trip or restock).

In certain embodiments, the control system 102 may determine the identity of the user based on the weight of the user, as received from the sensor 146. For example, the control system 102 may reference a residence profile corresponding the residence 104 that indicates potential users that may be at the residence 104 and/or that may access the pantry 142. The profile may indicate an identity of each user and a weight of each user. Accordingly, the control system 102 may determine the identity of the user based on the weight indicated by the sensor data (e.g., by identifying a weight in the residence profile that most closely matches the weight indicated by the sensor data). The user profile database 130 and/or another suitable database may store the residence profile, such that the control system 102 may retrieve the residence profile from the user profile database 130. The identify of the user may be determined in any of a variety of other ways, such as via biometric sensors and/or image data, as discussed in more detail herein.

In certain embodiments, the sensors 106 may include a sensor 147 disposed in the kitchen 110 and configured to capture images in the kitchen 110. For example, the sensor 147 may be a camera. The control system 102 may receive sensor data from the sensor 147 including images of the user in the kitchen and identify the user based on the images using image recognition techniques, such as in addition to or in place of identifying the user based on the sensor data received from the sensor 146. The sensor 147 may also capture images of the food being consumed by the user, and the control system 102 may identify the type and/or amount of food 144 using image recognition techniques (e.g., text recognition to read food labels). Additionally, each of the kitchen 110, the bedrooms 112, the bathroom 114, the living room 116, the hallway 118, the living room 120, and the outdoor area 122 include the sensors 147, such that the control system 102 may identify users, activities of the users, and/or locations of the users in each of these portions of the residence 104 based on sensor data received from the sensors 147. In certain embodiments, the user may have an option to enable (e.g., turn on) and/or disable (e.g., turn off) some or all of the sensors 146 and/or the sensors 147 to control collection of the sensor data via the sensors 146 and 147. For example, the user may generate, via the user interface 132, a schedule for the sensors 147 to capture images in some or all of the portions of the residence 104. In some embodiments, the control system 102 may provide a prompt indicating that the user may qualify for decreased insurance costs, if sensor data collection via the sensors 146 and/or 147 is enabled for at least a certain amount of time (e.g., a threshold amount of time, such as for a 24 hour period each week, a one hour period each day, or for daytime hours over a week or more).

The control system 102 may determine actions configured to improve the health of the user based on the conditions at the kitchen 110 of the residence 104. For example, the control system 102 may determine an improved diet for the user based on the types and/or amounts of the food 144 consumed by the user, which may improve the user's health by assisting the user to lose weight and/or consume healthier food. The control system 102 may determine that some or all of the food 144 is nearing expiration and may determine an action including consuming the food 144 and/or preserving the food 144, such as by placing the food 144 in a freezer, thereby improving the health of the user by reducing stress of the user and/or substantially preventing the user from consuming expired food. The control system 102 may determine that the food 144 is running low and determine that the food 144 should be reordered. The control system 102 may provide, via the user interface 132, a notification indicative of one or more of these actions, thereby enabling the user to perform the actions. In some embodiments, the control system 102 may automatically perform the actions and/or notify the user that the actions will or have been performed. In certain embodiments, the sensors 106 may include sensors 148 disposed at a refrigerator 150 of the kitchen 110. The refrigerator 150 may include a freezer. The sensors 148 may obtain data similar to the data obtained by the sensors 140, such that the control system 102 is configured to determine actions configured to improve the user's health based on types and/or amount of food in the refrigerator 150.

In certain embodiments, the sensors 106 may include sensors 154 disposed at a stove 156 (e.g., a stove, an oven, a combination stove/oven) and/or at a microwave 158 of the kitchen 110. The sensors 154 may obtain data indicative of use of the stove 156 and/or the microwave 158, as well as types and/or amounts of food prepared at the stove 156 and/or the microwave 158. Based on such sensor data, the control system 102 may determine actions configured to improve the health of the user. For example, the control system 102 may determine that an increased use of the stove 156 to prepare food, as compared to using the microwave 158, may improve the user's health (e.g., food prepared via the stove 156 may generally be healthier than food prepared via the microwave 158). Accordingly, the control system 102 may recommend that the user purchase food that may be prepared with the stove 156 and/or may recommend that the user cook with the stove 156 more often.

In certain embodiments, the sensors 106 may include the sensors 140 disposed at a sink 162 (e.g., a cabinet that supports the sink) of the kitchen 110 or other cabinet/storage location. The sensors 140 may obtain data indicative of amounts and/or types of cleaning supplies disposed at the sink 162 (e.g., in the cabinet that supports the sink 162). For example, the sensors 140 may be scales configured to weigh the cleaning supplies or cameras that obtain images of the cleaning supplies. The cleaning supplies may include any suitable cleaning supply configured to clean the residence 104, such as to clean the sink 162, the pantry 142, the refrigerator 150, the stove 156, the microwave 158, and/or other portions of the kitchen 110 or the residence 104. In certain embodiments, the user may identify the types of the cleaning supplies, such as by providing an input to the user interface 132. The control system 102 may determine actions configured to improve the health of the user based on sensor data received from the sensors 140. For example, the cleaning supplies may be unfit for human consumption, and the control system 102 may assess a status (e.g., a lock being locked or unlocked; a number of times the cleaning supplies have been accessed by an inappropriate user) and/or determine actions (e.g., locking the cupboard including the cleaning supplies, locking the kitchen 110, moving the cleaning supplies to a secure location) configured to substantially prevent human consumption of the cleaning supplies, such as by a child. The sensors 140 and/or the cameras about the residence 104 may also indicate whether the cleaning supplies have been left out of their normal location (e.g., the cabinet is locked without the cleaning supplies present; the cabinet is without the cleaning supplies for some extended period of time, such as longer than two hours; and/or images of the dining room show that the cleaning supplies are on a dining table). Accordingly, the control system 102 may determine, automatically implement, and/or notify the user of the actions related to the cleaning supplies.

As illustrated in FIG. 1, the sensors 146 and the sensor 147 are positioned adjacent to the pantry 142, the refrigerator 150, the stove 156, the microwave 158, and the sink 162. The sensors 146 and/or the sensor 147 may provide sensor data indicative of an identity of a user of the pantry 142, the refrigerator 150, the stove 156, the microwave 158, and/or the sink 162. For example, as described above, the sensors 146 may include scales and the sensor 147 may include a camera. The control system 102 may determine the identity of the user based on the sensor data received from the sensors 146 and the sensor 147.

In certain embodiments, the sensors 106 may include a sensor 164 disposed at the kitchen 110 and configured to obtain audio data indicative of noise (e.g., one or more noise types, one or more noise levels) in the kitchen 110. For example, the noise may include discussion by people in the kitchen, noises made by animals, noises made by appliances (e.g., the refrigerator 150, the stove 156, the microwave 158, the sink 162), noises made by structural portions of the residence 104 (e.g., doors, walls), and/or other portions of the kitchen 110 or components at the kitchen 110 configured to make noise. The control system 102 may determine a configuration of the residence 104 based on sensor data from the sensor 164 (e.g., a configuration of the residence 104 at the kitchen 110). For example, the control system 102 may determine that certain appliances are operating abnormally based on abnormal noises made by the appliances (e.g., based on the sensor data indicating noises made the appliances that are different from noises normally made by the appliances or that should normally be made by the appliances; different from a baseline or modeled noise signature).

The control system 102 may determine a health of a user based on the configuration of the residence 104 (e.g., the configuration of the kitchen 110). For example, the configuration may cause the user to be stressed, eat unhealthy types and/or amounts of foods, and/or may affect the user's concentration (e.g., noises may distract the user). Additionally, the control system 102 may determine modifications to the configuration configured to improve the health of the user. For example, the control system 102 may determine that a maintenance operation for the appliance will reduce the abnormal noise, thereby improving the health of the user (e.g., decrease the user's stress, improve the user's concentration). The maintenance operation may include adding oil and/or refrigerant to an appliance, greasing a hinge, cleaning an appliance, and other suitable maintenance operations. In certain embodiments, the control system 102 may determine the maintenance operation based on a period of time since a previous maintenance operation. For example, after a threshold period of time since the previous operation, the control system 102 may determine that a modification includes performing the maintenance operation again. The control system 102 may automatically initiate implementation of the modification, schedule implementation of the modification, and/or notify the user of the modification. The control system 102 may receive an input or selection from the user that indicates completion of the modification and/or the control system 102 may be configured to identify (e.g., based on the sensor data) completion of the modification. For example, the control system 102 may receive additional sensor data indicative of the conditions at the residence 104 (e.g., an update to the conditions) and determine that the modification was completed (e.g., implemented) based on the additional sensor data. In some embodiments, the control system 102 may determine that the modification was completed based on the conditions (e.g., updated conditions) returning to a normal operating range and/or based on the conditions otherwise indicating that the modification complies with the modification previously identified by the control system 102. As discussed herein, the control system 102 may adjust an insurance cost for the user in response to and/or based on completion of the modification.

The control system 102 may determine the configuration based on other conditions at the kitchen 110, such as in addition to or in place of the sensor data received from the sensor 164. For example, the sensors 148 may obtain data indicative of conditions within the refrigerator 140 (e.g., a temperature, a humidity), and the control system 102 may determine the configuration based on the conditions (e.g., the temperature and/or humidity within the refrigerator 140 may indicate whether the refrigerator 140 is operating properly). In another example, the sensors 154 may obtain data indicative of conditions at the stove 156 and/or the microwave 158 (e.g., a temperature at the stove 156 and/or a temperature at the microwave 158), and the control system 102 may determine the configuration based on the conditions (e.g., the temperature may indicate whether the stove 156 and/or the microwave 158 is operating properly). The control system 102 may determine the health of the user based on the configuration and determine modifications to the configuration configured to improve the health of the user.

The control system 102 may determine the configuration based on the types, amounts, and/or locations of the food 144 and/or based on the types, amounts, and/or locations of the cleaning supplies in the kitchen 110. The control system 102 may determine health of a user based on such a configuration. For example, the configuration may indicate that some or all of the food 144 and/or the cleaning supplies are at a location accessible by a particular user that should not have access to the food 144 and/or the cleaning supplies. More specifically, foods such as alcohol and/or the cleaning supplies may be at a location in the kitchen 110 that is accessible to a child. The control system 102 may determine that consumption of the food and/or the cleaning supplies by the child may be adverse to the child's health and/or that the possibility of consumption by the child may be stressful to another user (e.g., the child's parent, an adult), thereby adversely affecting the other user's health. The control system 102 may determine the child's health and/or the other user's health based on the configuration and may determine modifications configured to improve the health. The modifications may include moving the food 144 and/or the cleaning supplies to a location not accessible by the user (e.g., the child), locking the pantry 144, locking a cupboard containing the cleaning supplies, and/or other appropriate modifications. In some embodiments, the control system 102 may determine that a user that should or should not have accessed the food 144 and/or the cleaning supplies did in fact access the food 144 and/or the cleaning supplies, and the control system 102 may provide a notification indicative of the access, such as an alert or warning.

In certain embodiments, the control system 102 may determine that the food 144 and/or the cleaning supplies are running low relative to an amount typically stored in the kitchen 110 and/or an amount set by the user. Such a configuration may cause a user of the residence 104 to be stressed, deprived of the food 144, and/or may reduce a cleanliness of the residence 104. The control system 102 may determine modifications including reordering the food 144 and/or the cleaning supplies, such as automatically reordering on a periodic basis based on a history (e.g., average or median time until running low) and/or in response to running low.

In certain embodiments, the control system 102 may determine that the configuration includes the stove 156 being left on and/or a gas leak at the stove 156 based on sensor data from the sensor 154, which may adversely affect the health of a user. The control system 102 may determine modifications including turning off the stove 156 and/or turning off a gas supply based on the configuration and may automatically implement and/or notify the user of such modifications.

In certain embodiments, the control system 102 may determine the recommendation for temporary residences based on sensor data received from the sensors 106 disposed at the kitchen 110. For example, the control system 102 may determine potential temporary residences having food, cleaning supplies, and/or appliances similar to that disposed in the kitchen 110. The control system 102 may automatically book a particular temporary residence, such as the particular temporary residence having conditions most similar to the residence 104, and/or may provide a notification to the user, thereby enabling the user to select the particular temporary residence from among the temporary residences identified in the recommendation.

As illustrated, the bedrooms 112 of the residence 104 include beds 170 and dressers 172. In certain embodiments, the sensors 106 may include sensors 174 disposed at the beds 170 and/or sensors 176 disposed at the dressers 172. The sensors 174 may obtain data indicative of a bed type (e.g., size), a bedding type (e.g., thickness of a comforter), a bed firmness, and/or sleep activity of a user. The sleep activity of the user may include a sleep schedule and/or a sleep pattern (e.g., deep sleep, REM cycle, light sleep). The sensors 176 may obtain data indicative of noise in the bedrooms 112 including noise while a user is sleep or attempting to sleep. For example, some users may prefer ambient noise while sleeping, and other users may prefer no noise.

The control system 102 may determine a health of a user based on the conditions at the bedrooms 112 (e.g., based on the sensor data received from the sensors 146 and/or 147) and actions configured to improve the user's health based on the conditions. For example, the sleep activity of the user may indicate that the user is obtaining insufficient and/or poor sleep on a nightly basis. The control system 102 may determine an action including changing the bed type, bedding type, and/or bed firmness would improve the user's sleep. Accordingly, the control system 102 may notify the user of such an action. In certain embodiments, the control system 102 may automatically adjust the bed firmness (e.g., the bed 170 may configured to be adjusted by the control system 102).

As described above, the control system 102 may receive a user request for a temporary residence that is different from the residence 104. For example, the user request may be for a hotel room, vacation rental property, and/or another suitable temporary residence. The control system 102 may determine a recommendation of potential temporary residences based on the conditions at the residence 104, such as temporary residences having the same or similar bed types, bedding types, bed firmness, and/or noise levels as those at the bedrooms 112. The control system 102 may notify the user of the recommendation and/or may automatically book a particular temporary residence. Other features that may be detected by the sensors 146 and/or 147 and/or that may be otherwise input into the control system 102 to enable the control system 102 to identify and to recommend the potential temporary residences include lighting in the bedroom 112 (e.g., a number of lights; a brightness of lights; a type of lights, such as ceiling or table), a number of windows in the bedroom 112, a brightness within the bedroom 112 during overnight hours (e.g., due to outside light and/or lack of window coverings), a presence of a ceiling fan in the bedroom 112, a floor material in the bedroom 112 (e.g., carpet, tile, or wood), a paint color in the bedroom 112, and the like. For example, the user may sleep better in the temporary residence that shares these features with the residence 104 and/or that has certain ones of these features (e.g., low light within the bedroom 112 during overnight hours).

In certain embodiments, the control system 102 may determine a configuration of the residence 104 based on the noise levels at the bedrooms 112. For example, the noise levels may be related to items in the bedrooms 112 (e.g., fans, televisions), appliances in other portions of the bedrooms 112, other items outside the bedrooms 112, and other suitable items configured to make noise. The control system 102 may determine a health of a user based on the noise levels. For example, the noise levels may adversely affect sleep of the user. The control system 102 may determine modifications including adjusting operation of the items in the bedroom 112, appliances in the residence 104, and/or other items outside the bedroom 112, closing doors of the bedroom, using white noise machines, and other suitable modifications configured to improve the user's health (e.g., improve a quality of sleep for the user).

As illustrated, the bathroom 114 of the residence 104 includes the sensors 146 and 147 configured to provide sensor data indicative of an identity of a user in the bathroom 114, as well as the sensor 140 configured to provide sensor data indicative of weights and/or types of cleaning supplies disposed in the bathroom 114. For example, the cleaning supplies may be any suitable cleaning supply configured to clean a sink 180, a shower 182, and/or a toilet 184. In certain embodiments, the sensor 140 may provide sensor data indicative of weights and/or types of other supplies in the bathroom 114, such as hair products, bathing supplies, toilet paper, and other suitable bathroom supplies.

Similar to the kitchen 110, the control system 102 may determine a health of the user and/or a configuration of the residence 104 based on sensor data received from the sensor 140. For example, the cleaning supplies and/or bathroom supplies may be unfit for human consumption, and the control system 102 may determine actions (e.g., locking the cupboard including the cleaning supplies and/or bathroom supplies, moving the cleaning supplies and/or bathroom supplies to a secure location) configured to substantially prevent human consumption, such as by a child. Accordingly, the control system 102 may determine, automatically implement, and/or notify the user of the actions related to the cleaning supplies and/or bathroom supplies.

Additionally, the control system 102 may determine the configuration of the residence 104 based on the sensor data received from the sensor 140. For example, the configuration may include certain cleaning supplies and/or bathroom supplies being empty or running low. The control system 102 may determine that the absence and/or low level of the cleaning supplies and/or bathroom supplies may adversely affect a cleanliness of the bathroom 112 and/or of the user, thereby affecting the health of the user. Accordingly, the control system 102 may identify modifications to the configuration including reordering the cleaning supplies and/or bathroom supplies and/or notifying the user of the absence and/or low levels. In some embodiments, the control system 102 may determine modifications to the configuration including maintenance of the sink 180, the shower 182, and/or the toilet 184 based on sensor data received from the sensor 140 and/or another sensor at the bathroom 114. In certain embodiments, the control system 102 may determine potential temporary residences having conditions the same as or similar to the conditions at the bathroom 112, such as the same or similar cleaning supplies, bathroom supplies, type of shower 182, type of toilet 184, and/or other suitable conditions (e.g., lighting, flooring).

As illustrated, the living room 116 includes a television 190, a couch 192, a table 194, and chairs 196. The sensors 106 may include a sensor 200 disposed at the television 190, a sensor 202 disposed at the couch 192, sensors 204 disposed at the table 194, and/or sensors 206 disposed at the chairs 196. The sensor 200 may obtain data indicative of usage of the television 190 and/or programming displayed via the television. For example, the data may include times of day that the television 190 is used, types of the programming (e.g., episodic series, movies, fiction, non-fiction), program lengths, and other suitable information related to the programming. In some embodiments, the television 190 may include the sensor 190. In some embodiments, the sensor 190 and/or another sensor may obtain data indicative of noise at the living room 116, such as noise produced by the television 190, noise produced by a user, noise produced by the couch 192, table 194, and/or chairs 196, and/or noise produced by the residence 104 generally.

The sensor 202 may obtain data indicative of usage of the couch 192, such as a user sitting and/or laying on the couch 192, changes to a position of the user on the couch 192, a weight of the user on the couch 192, times of day and/or durations of time that the couch 192 is used, and other information about the user on the couch 192. In certain embodiments, the sensor data from the sensor 202 may indicative multiple users on the couch 192 and/or a weight of each user. The sensors 204 may obtain data indicative of usage of the table 194, weights of items on the table 194, indications of types of the items on the table 194 (e.g., indications that the items are food or plates/bowls of food), and/or locations of the items on table 194. The sensors 206 may obtain data indicative of usage of the chairs 196 and/or weights of users using the chairs 196.

The control system 102 may determine a health of a user based on sensor data received from the sensors 200, 202, 204, and/or 206. For example, usage of the couch of the couch 192 for extended periods of time may indicate an unhealthy lifestyle of the user and/or that the user is ill (e.g., if the user spends most of a day on the couch 192 while not typically spending most of a day on the couch 192). In another example, viewing intense and/or frightening programming at night and/or just before a user typically sleeps may indicate that the user is not taking steps to ensure a sufficient night's sleep. Viewing educational (e.g., non-fictional) content on the television 190 may indicate that the user is attempting to enrich and increase their knowledge with respect to a particular subject, while viewing fictional content may be less likely to enrich the user's knowledge. The weight and/or a timeline of food consumed at the table 194, along with the identity indicated by the weight at the chair 196, may indicate a caloric intake for a particular user. The control system 102 may determine the user's health using each of these conditions, among other conditions.

Additionally, the control system 102 may determine actions configured to improve the user's health based on the conditions. Examples of such actions may include viewing calming programming and/or reading just before going to bed, turning off the television 196 after a period of time, adjusting a height of the table 194 to enable the user to stand at the table 194 rather than sitting on the chair 196, and other suitable actions. Accordingly, the control system 102 may notify the user of these actions and/or may automatically perform the actions.

In some embodiments, the control system 102 may determine a configuration of the residence 104 based on the conditions at the living room 116, such as conditions indicated by sensor data received from the sensors 200, 202, 204, and/or 206. For example, the configuration may include a general status of the television 190, the couch 192, the table 194, the chairs 196, and other suitable components at the living room 116. The status may include an age, an amount of wear, a working status (e.g., working efficiently, working inefficiently, broken, repaired), and/or the presence, type, and/or severity of defects. The control system 102 may determine a health of the user based on the configuration, such as a stress level of the user associated with the configuration. For example, a broken television 190 or an old couch 192 may cause the user to have a relatively high stress level or to be depressed compared to a configuration in which the television 190 is not broken and/or the couch 192 is new. The control system 102 may determine modifications to the configuration configured to improve the health of the user including repairing the television 190 and/or replacing the couch 192 with a newer couch. In certain embodiments, the control system 102 may determine potential temporary residences having conditions the same as or similar to the conditions at the living room 116, such as a television similar to the television 190, a couch similar to the couch 192, a table similar to the couch 194, chairs similar to the chairs 196, and/or other suitable conditions (e.g., lighting, windows, flooring, spacing between the television and the couch).

As illustrated, the garage 120 (e.g., an enclosed garage, a covered carport, an uncovered driveway) includes a vehicle 210 and a shelf 212 having tools 214 and cleaning supplies 216. The sensors 106 may include the sensors 140 disposed at the cleaning supplies 216, sensors 218 disposed at the tools 214, and/or sensors 220 disposed at the vehicle 210. Similar to the sensors 140 disposed at the kitchen 110 and/or at the bathroom 114, the sensors 140 at the garage 120 may obtain data indicative of amounts and/or types of the cleaning supplies 216 disposed in the garage 120, such as supplies for cleaning the vehicle 210, cleaning the garage 120, and/or cleaning the residence 104 generally. The sensors 218 may obtain data indicative of the tools 214 being at particular locations in the garage 120, usage of the tools 214, noises made by the tools 214, and/or types of the tools 214. The sensors 220 may obtain data indicative of the vehicle 210 being at least partially disposed in the garage 120, usage of the vehicle 210, and/or a type of the vehicle 210. In some embodiments, the user may provide an input identifying the types of the tools 214, types and/or amounts of the cleaning supplies 216, and/or a type of the vehicle 210, such as via the user interface 132.

The control system 102 may determine a health of a user based on sensor data received from the sensors 140, 146, 214, and/or 216. For example, the sensor data may indicate that a particular user is able to access the tools 214 that should not be able to access the tools 214, such as a child. In another example, the vehicle 210 being disposed in the garage 120 for extended periods of time may indicate that a user does not leave the residence very often, is sick, is depressed, and/or is unemployed. The sensor data received from the sensors 220 may also indicate that the user makes very short trips using the vehicle 210, such as trips that could be made by traveling on foot. Similar to the cleaning supplies disposed at the kitchen 110 and the bathroom 112, the cleaning supplies 216 may be unfit for human consumption. The control system 102 may determine actions configured to improve a health of a user based on the conditions at the garage 120. For example, the actions may include changing locations of the tools 214 and/or the cleaning supplies 216, locking a cabinet having the tools 214 and/or the cleaning supplies 216, walking to certain destinations rather than driving to the destinations, and other suitable actions. In certain embodiments, the control system 102 may identify the user positioned in the residence 104 based on the vehicle 210 positioned in the garage 120. For example, the vehicle 210 may be one of multiple vehicles that typically park at the residence 104, where each vehicle is driven by a particular user.

In some embodiments, the control system 102 may determine a configuration of the residence 104 based on the conditions at the garage 120, such as conditions indicated by sensor data received from the sensors 140, 146, 214, and/or 216. For example, the configuration may include a general status of the tools 214, the cleaning supplies 214, the vehicle 210, and other suitable components at the garage 120. The status may include an age, an amount of wear, a working status (e.g., working efficiently, working inefficiently, broken, repaired), and/or the presence, type, and/or severity of defects. The control system 102 may determine a health of the user based on the configuration, such as a stress level of the user associated with the configuration. For example, a broken tool 214, a broken vehicle 210, and/or a relatively low amount of the cleaning supplies 216 may cause the user to have a relatively high stress level or to be depressed. The control system 102 may determine modifications to the configuration to improve the health of the user including repairing the tool 214, repairing the vehicle 210, and/or replenishing the cleaning supplies 216. In certain embodiments, the control system 102 may determine potential temporary residences having conditions the same as or similar to the conditions at the garage 120, such as tools similar to the tools 214, cleaning supplies similar to the cleaning supplies 216, a vehicle similar to the vehicle 210, and/or other suitable conditions.

The outdoor area 122 of the residence 104 includes a grassy area 230 and a garden 232. The sensors 106 may include the sensor 147 configured to obtain and provide image data of the outdoor area and/or a sensor 234 disposed at the garden 232 and configured to obtain and provide data relative to the garden 232. For example, the image data provided by the sensor 147 may indicate the existence of the grassy area 230 and/or the garden 232, sizes of the grassy area 230 and/or the garden 232, information about grass 238 in the grassy area 230 (e.g., type, height, density, color), that there are plants 236 growing in the garden 232, information about the plants 236 (e.g., types, size, maturity), and other information that may be discerned from images of the grassy area 230, such as a presence and/or usage of recreational equipment (e.g., basketball hoop or swimming pool). The sensor 234 may obtain data indicative of information about the plants 236, the presence of pesticides, information about soil at the garden 232 (e.g., moisture content, soil type, soil density), and other information about the garden 232.

The control system 102 may determine a health of a user based on sensor data received from the sensors 147 and/or 234. For example, the control system 102 may determine that the user is likely consuming vegetables based on the existence of the garden 232 and the plants 236 growing in the garden 232, which may improve the health of the user. Additionally, the control system 102 may determine that the user is active based on the existence of the plants 236 in the garden 232. The control system 102 may determine actions configured to improve a health of a user based on the conditions at the outdoor area 122. For example, the actions may include planting new, additional, and/or different plants in the garden 232, expanding the grassy area 230 and/or the garden 232, decreasing an amount and/or usage of pesticide, and other suitable actions.

In some embodiments, the control system 102 may determine a configuration of the residence 104 based on the conditions at the outdoor area 122, such as conditions indicated by sensor data received from the sensors 147 and/or 234. For example, the configuration may include a general status of the grassy area 230 and/or the garden 232. The status may include a size and/or whether the grassy area 230 and/or the garden 232 are maintained. The control system 102 may determine a health of the user based on the configuration, such as a stress level of the user associated with the configuration. For example, the control system 102 may determine that an unkempt grassy area 230 will cause the user to be stressed and/or inactive, while a maintained grassy area 230 will cause the user to be unstressed and/or active. The control system 102 may determine modifications to the configuration configured to improve the health of the user including maintaining the grassy area 230 (e.g., mowing the grass 238), planting new and/or additional grass in the grassy area 230, and/or maintaining the garden 232. In certain embodiments, the control system 102 may determine potential temporary residences having conditions the same as or similar to the conditions at the outdoor area 122, such as a grassy area similar to the grassy area 230, a garden similar to the garden 232, plants similar to the plants 236, and/or other suitable conditions.

As illustrated, the sensors 106 may include the sensor 147 (e.g., a camera) disposed at the hallway 118. The sensor 147 may capture images of the hallway 118 and/or users in and/or passing through the hallway. The control system 102 may identify the users in the hallway 118 and/or passing between portions of the residence 104. For example, based on a user exiting the hallway 118 and entering the bathroom 114, the control system 102 may determine that the user is positioned in the bathroom 114.

In certain embodiments, the sensors 106 may provide sensor data indicative of recreation of users of the residence 104, performance of other activities of the users (e.g., non-recreational activities), and/or movement of recreational equipment at the residence 104. For example, the sensors 147 may capture imagery (e.g., images, video) of the users performing recreational activities (e.g., exercising, playing sports) and/or performing non-recreational activities (e.g., watching the television 190, washing hands) inside and/or outside of the residence 104. In some embodiments, the sensors 106 may include sensors configured to provide sensor data indicative of locations, types, and/or usage of recreational equipment (e.g., sports equipment, recreational attire) at the residence 104. In an example embodiment, the sensor 147 positioned at the outdoor area 122 may provide sensor data indicative of a user running around the grassy area 230. In another example, the sensor 147 positioned at the hallway 118 may provide sensor data indicative of a user exiting the residence 104 while wearing recreational attire.

The control system 102 may determine the health of the user based on such recreational conditions at the residence 104 (e.g., based on recreation of the users, performance of other activities, and/or movement of recreational equipment). For example, the user performing recreational activities may indicate that the user is healthy and active. Recreational equipment sitting idly for extended periods of time may indicate that the user does not exercise. The control system 102 may also determine actions configured to improve the health of the user based on the conditions related to recreation. For example, the actions may include maintaining a current workout regimen of the user and/or to start a new workout regimen.

In certain embodiments, the control system 102 may determine temporary residence based on the recreational conditions at the residence 104. For example, the control system 102 may identify temporary residences having the same or similar recreational equipment and/or recreational areas (e.g., similar to the grassy area 230, a gym, or another portion of the residence 104) as the recreational equipment and/or recreational areas at the residence 104.

In certain embodiments, the health management system 100 may include the residence 104, portions of the residence 104, and/or items disposed at the residence 104. For example, the health management system 100 may include the kitchen 110 and/or items within the kitchen 110 (e.g., the refrigerator 150, the oven 156, the microwave 158, the sink 162). In such cases, the items may be smart devices that include or operate as sensors that provide the sensor data to the control system 102.

As described above, the control system 102 may provide a notification to the user indicative of the actions configured to improve the user's health, the modifications to the configuration of the residence 104 configured to improve the user's health, and/or the recommendation of temporary residences. Additionally, the control system 102 may receive an indication and/or determine that the user has performed an action indicated in the notification, implemented a modification, and/or selected a particular temporary residence from among the recommended temporary residences. Based on such an indication and/or determination, the control system 102 may determine a corresponding improvement to the user's health and/or an adjustment (e.g., a decrease) to an insurance cost associated with the user. In some embodiments, the control system 102 may determine the adjustment to the insurance cost based on the improvement to the user's health. The insurance cost may be an insurance premium and/or an insurance deductible for any insurance policy associated with the user, such as a life insurance policy, a health insurance policy, a disability insurance policy, a homeowner's insurance policy, and/or an automobile insurance policy. In certain embodiments, the control system 102 may determine a deterioration of or no change in the user's health based on the user not performing the action, not implementing one of the modifications, and/or not selecting a temporary residence from among the recommended temporary residences. The control system 102 may determine an adjustment (e.g., an increase) to the insurance cost based on the deterioration of or no change in the user's health. In some embodiments, the control system 102 may generate an insurance policy for the residence 104 and/or the vehicle 210 based on the conditions at the residence 104, based on user interactions with the health management system 100, and/or based on the user's health.

The adjustments to an insurance cost associated with the user may be determined and/or performed by the control system 102 at a particular frequency (e.g., daily, weekly, monthly, annually), in response to receiving a user input, in response to receiving the user request for a temporary residence, in response to identifying a change in the financial information and/or job status for the user, and/or in response to other factors. The user input may include a user request to determine an adjustment, such as a request received from a user of the insurance policy (e.g., an owner or renter of the residence 104 and/or the vehicle 210) or a request received from a provider of the insurance policy (e.g., an insurance institution).

In certain embodiments, the control system 102 may notify the user of the opportunity to improve the health and/or decrease an insurance cost in response to the user approving the collection of the sensor data from the sensors 106. For example, the notification to the user may indicate that the sensors 106 will collect and provide sensor data for a particular time period (e.g., one day, one month, one year) to enable the user to qualify for potential health improvements and/or adjustments to the insurance cost. In response to receiving user approval, the control system 102 may begin collecting and processing the sensor data. It should also be appreciated that the insurance cost for the temporary residence may be adjusted based on a user (e.g., an owner) inputting and/or authorizing collection of sensor data at the temporary residence. In this way, the user associated with the temporary residence may receive a financial benefit via a reduction in insurance costs in exchange for providing the sensor data that enables the control system 102 to recommend appropriate temporary residences to other users.

In certain embodiments, the control system 102 may control the sensors 106, such as by directly controlling the sensors 106 or by controlling communication with the sensors 106. For example, after receiving the sensor data from the sensors 106, after determining the actions/modifications/recommendation described above, and/or after receiving additional sensor data from the sensors 106, the control system 102 may instruct the sensors 106 to turn off, thereby reducing power consumption by the sensors 106. The control system 102 may also block communication with the sensors 106 and/or instruct the sensors 106 to stop sending data to the control system 102, thereby reducing power consumption at the sensors 106 associated with such communication.

In certain embodiments, the sensors 106 may obtain data indicative of physical health parameters of the user, such as a heart rate, motion of the user, and other health parameters. For example, the sensors 106 may include or be part of a device to be worn on the user's wrist that is configured to track the user's heart rate, a mobile device of the user configured to track movement of the user (e.g., vertical acceleration such as acceleration due walking and/or running, a physical location), and other suitable devices.

Figure 2:
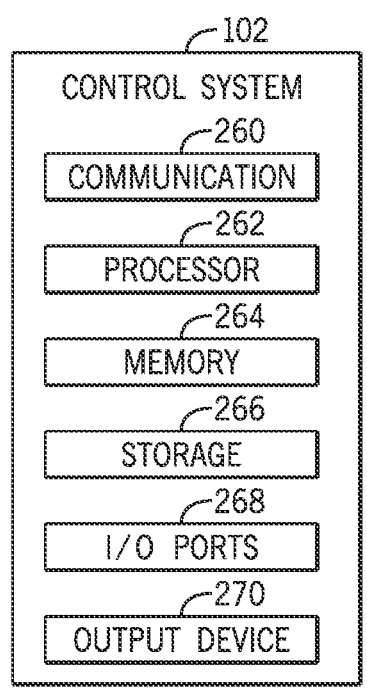
FIG. 2 illustrates a block diagram of components that may be part of the control system of FIG. 1, in accordance with embodiments described herein.

The control system 102 may include certain components to facilitate these actions. FIG. 2 illustrates a block diagram of components that may be part of the control system 102 of FIG. 1. For example, the control system 102 may include a communication component 260, a processor 262, a memory 264, a storage 266, input/output (I/O) ports 268, an output device 270 (e.g., a display or a speaker), or any of a variety of other components that enable the control system 102 to carry out the techniques described herein. The communication component 260 may be a wireless or wired communication component that may facilitate communication between the control system 102, various devices within the residence 104, the sensors 106, the user profile database 130, and the user interface 132.

The processor 262 may be any suitable type of computer processor or microprocessor capable of executing computer-executable code. The processor 262 may also include multiple processors that may perform the operations described below. The memory 264 and the storage 266 may be any suitable articles of manufacture that can serve as media to store processor-executable code, data, or the like. These articles of manufacture may represent computer-readable media (e.g., any suitable form of memory or storage) that may store the processor-executable code used by the processor 262 to perform the presently disclosed techniques. The memory 264 and the storage 266 may also be used to store the data, various other software applications, and the like. The memory 264 and the storage 266 may represent non-transitory computer-readable media (e.g., any suitable form of memory or storage) that may store the processor-executable code used by the processor 262 to perform various techniques described herein. It should be noted that non-transitory merely indicates that the media is tangible and not a signal.

The I/O ports 268 may be interfaces that may couple to other peripheral components such as input devices (e.g., keyboard, mouse), sensors, input/output (I/O) modules, and the like. The output device 270 may operate to depict indications associated with software or executable code processed by the processor 262. In one embodiment, the output device 270 may be an input device. For example, the output device 270 may include a touch display capable of receiving inputs from a user of the control system 102. The output device 270 may be any suitable type of display, such as a liquid crystal display (LCD), plasma display, or an organic light emitting diode (OLED) display, for example. In one embodiment, the output device 270 may depict or otherwise provide notifications described above with respect to conditions at the residence 104 and determinations made based on the conditions. In certain embodiments, the output device 270 may be the user interface 132 or may include the user interface 132. It should be noted that the components described above with regard to the control system 102 are exemplary components, and the control system 102 may include additional or fewer components as shown.

Figure 3:
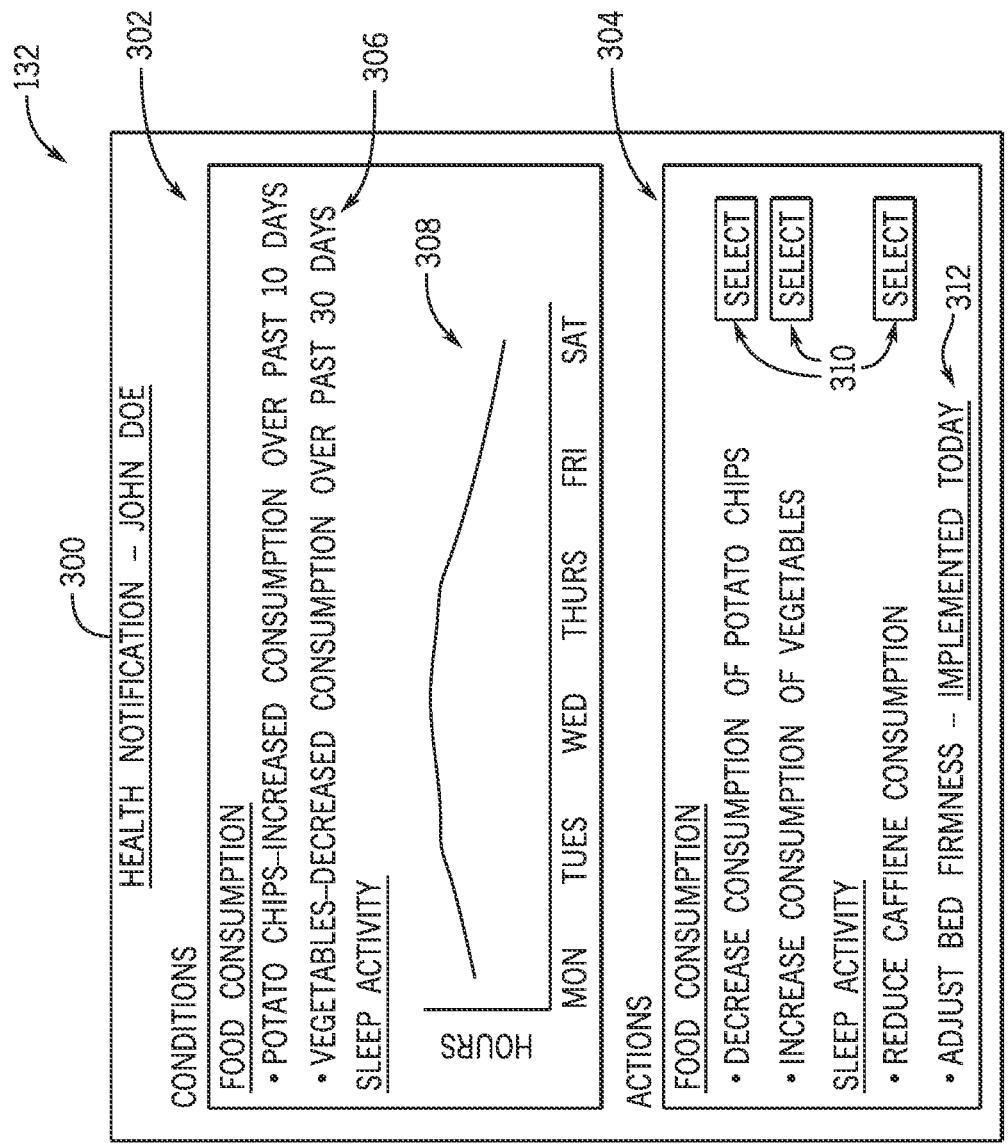
FIG. 3 illustrates a representation of a user interface that may be generated by the health management system of FIG. 1, in accordance with embodiments described herein.

With the foregoing in mind, examples of notifications that may be provided by the health management system 100 are discussed below with reference to FIGS. 3 and 4. For example, FIG. 3 illustrates a representation of the user interface 132 that may be generated by the control system 102 of the health management system 100. The control system 102 may generate the representation in response to receiving sensor data indicative of conditions at the residence 104, in response to receiving user input, and/or automatically on a periodic basis (e.g., hourly, daily, monthly, annually).

In the illustrated embodiment, the representation of the user interface 132 includes a notification 300 that may display information about conditions at the residence 104 and actions configured to improve a user's health. More specifically, the notification 300 includes a conditions portion 302 configured to display conditions at the residence 104 as indicated by sensor data received from the sensors 106. Additionally, the notification 300 includes an actions portion 304 configured to display actions for improving a user's health. The control system 102 may receive sensor data indicative of conditions including food consumption from the sensors 140, 146, and/or 148, as well as sleep activity from the sensors 147, 174, and/or 176. Based on the received sensor data, the control system 102 may generate the conditions portion 302 to include a "FOOD CONSUMPTION" summary 306 and a "SLEEP ACTIVITY" summary 308, thereby enabling a user to view information about the conditions. In the illustrated embodiment, the summary 306 indicates that the user has increased consumption of potato chips (e.g., a generally unhealthy food) and decreased consumption of vegetables (e.g., a generally healthy food). The summary 308 indicates that an amount of sleep obtained by the user has decreased over a six day period. In other embodiments, the conditions portion 302 may include information about other conditions at the residence 104.

As described above, the control system 102 may determine the health of the user based on the conditions at the residence 104. For example, the control system 102 may determine that the increased consumption of potato chips and decreased consumption of vegetables has caused the user's health to deteriorate (e.g., to gain weight, to be deficient in nutrients). Additionally, the control system 102 may determine that the decreasing amount of sleep obtained by the user has caused the user's health to deteriorate (e.g., to be stressed, to be anxious). The control system 102 may determine actions configured to improve the health of the user, such as decreasing consumption of potato chips, increasing consumption of vegetables, reducing caffeine consumption, and/or adjusting bed firmness, each of which are listed in the actions portion 304 of the notification 300.

The user may view the actions portion 304 to understand the actions that may improve their health. In certain embodiments, the actions portion 304 may include selection elements 310 configured to receive user selections of specific actions. In response to receive a selection of a particular action, the control system 102 may analyze additional sensor data, such as additional data indicating food consumption by the user and/or sleep activity of the user after the user provided the selection, to determine if the user implemented the action and/or achieved the improvement to their health. In some embodiments, the control system 102 may automatically perform actions and/or may notify the user of the performed actions. For example, an implementation element 312 of the actions portion 304 indicates that a bed firmness was adjusted.

In certain embodiments, the control system 102 may generate a notification indicative of modifications to a configuration of the residence 104 that are configured to improve the user's health, thereby enabling the user to view and/or select particular modifications to be implemented. In certain embodiments, the control system 102 may generate a notification indicative of a recommendation of temporary residences for selection of a particular temporary residence, such as in response to a user request for a temporary residence. In some embodiments, the notification may indicate a particular temporary residence that was automatically booked by the control system 102 in response to the user request for the temporary residence. The notifications regarding the temporary residences and the modifications to the configuration of the residence may be similar to the notification 300 of FIG. 3.

Figure 4:
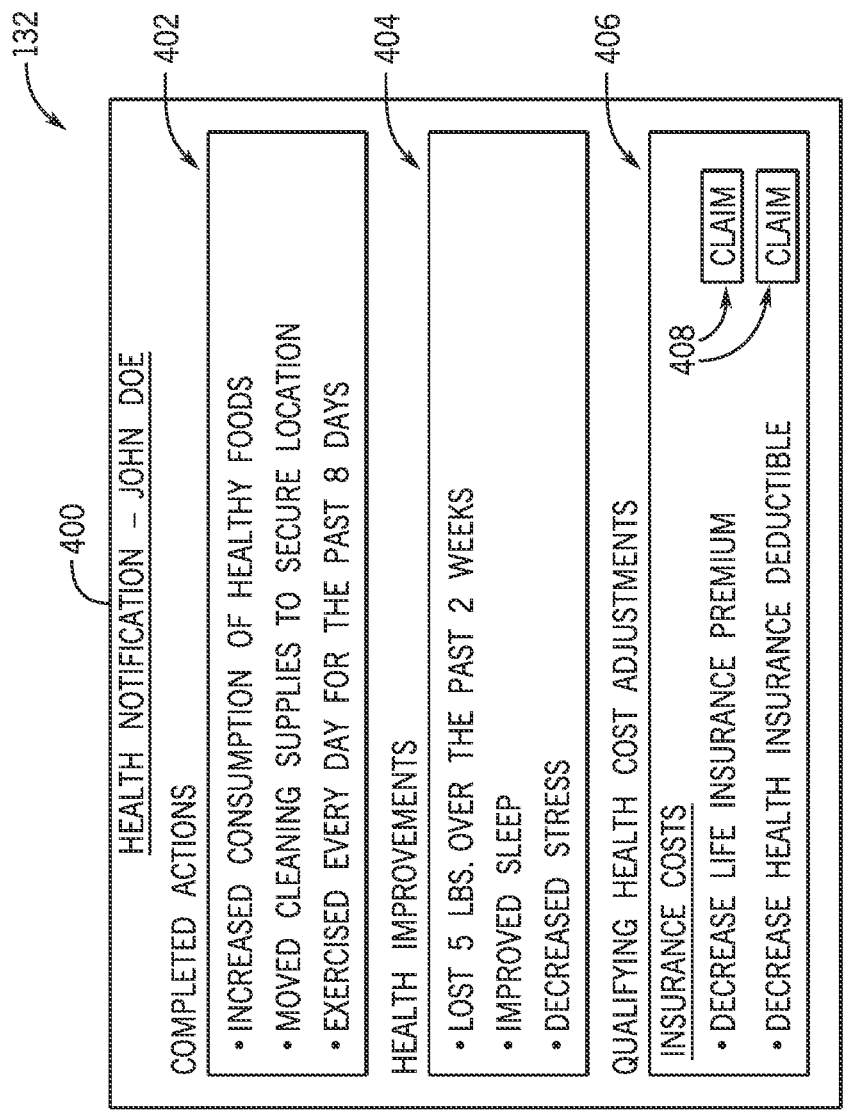
FIG. 4 illustrates a representation of a user interface that may be generated by the health management system of FIG. 1, wherein the user interface presents insurance cost adjustments, in accordance with embodiments described herein.

After providing the representation of the user interface 132 of FIG. 3 or independent of providing the representation of FIG. 3, the control system 102 may generate and provide the representation of the user interface of FIG. 4. In FIG. 4, the representation includes a notification 400. As illustrated, the notification 400 includes a completed actions portion 402, a health improvements portion 404, and a qualifying health cost adjustments portion 406. The completed actions portion 402 may indicate specific actions performed by the user and/or by the control system 102 that are configured to improve the user's health. For example, in the illustrated embodiment, the completed actions portion 402 lists actions including increasing consumption of healthy foods, moving cleaning supplies to a secure location, and exercising every day for the past eight days. The health improvements portion 404 may indicate health improvements achieved by the user, such as health improvements associated with the actions listed in the completed actions portion 402. As illustrated, the health improvements include losing five pounds over the past two weeks, improved sleep, and decreased stress. In some embodiments, the completed actions of the completed actions portion 402 and/or the health improvements of the health improvements portion 404 may correspond to the conditions and/or action identified in the notification 300 of FIG. 3.

The qualifying health cost adjustments portion 406 may list potential health cost adjustments associated with performance of the actions and/or the improvements to the user's health. As illustrated, the health cost adjustments including insurance cost adjustments of decreasing a life insurance premium and decreasing a health insurance deductible. In certain embodiments, the notification 300 may include indications of adjustments to insurance costs for other insurance policies, such as disability insurance, homeowner's insurance, and/or automobile insurance. Additionally, the qualifying health cost adjustments portion 406 includes claim elements 408 configured to receive user selections of specific health cost adjustments. For example, the user may select the claims element elements 408, and in response to receiving the user selections, the control system 102 may implement the health cost adjustments (e.g., decrease the life insurance premium, decrease the health insurance deductible). In some embodiments, the control system 102 may automatically implement the health cost adjustments, such as independent of user selection/approval, and notify the user of the health cost adjustments.

Figure 5:
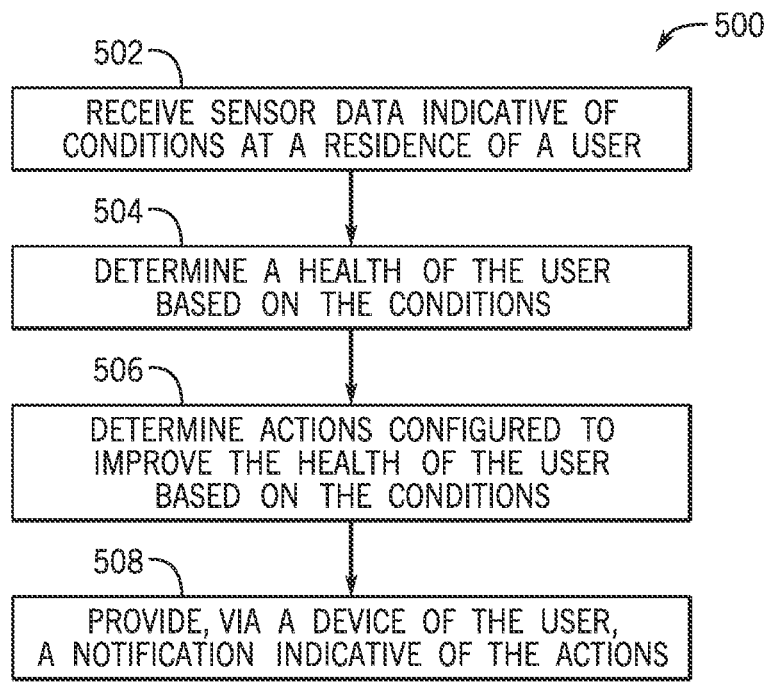
FIG. 5 illustrates a flow chart of a method for determining actions for improving a user's health using the health management system of FIG. 1, in accordance with embodiments described herein.

FIG. 5 illustrates a flow chart of a method 500 for determining actions configured to improve a user's health using the control system 102 of FIG. 1. The following description of the method 500 will be described as being performed by the control system 102, but it should be noted that any suitable processor-based device may be specially programmed to perform any of the methods described herein. Moreover, although the following description of the method 500 is described as including certain steps performed in a particular order, it should be understood that the steps of the method 500 may be performed in any suitable order, that certain steps may be omitted, and/or that certain steps may be added.

At block 502, the control system 102 may receive sensor data indicative of conditions at the residence 104 of a user. For example, the control system 102 may receive the sensor data from some or all of the sensors 106 disposed at the residence 104. In certain embodiments, the control system 102 may instruct and/or the control the sensors 106 to provide the sensor data. The sensor data may be indicative of conditions at the residence 104, such as weights and types of food, weight and locations of cleaning supplies, sleep activity of the user, television activity of the user, recreation of the user, and/or other conditions described herein.

At block 504, the control system 102 may determine a health of the user based on the conditions at the residence 104. For example, the conditions may affect (e.g., positively affect, negatively affect) the user's health, such as by affecting the user's weight, stress level, concentration, and other health parameters. In certain embodiments, the control system 102 may compare the user's health and/or a specific health parameter to a threshold. For example, the control system 102 may compare a weight or body mass index (BMI) of the user to the threshold and determine whether the user is healthy based on the comparison. The control system 102 may also utilize one or more algorithms that compare and account for multiple different health parameters to generate a health score (e.g., on a scale of 1 to 10) and/or to identify one or more parameters that should or could be improved.

At block 506, the control system 102 may determine actions configured to improve the user's health based on the conditions at the residence 104. For example, the actions may include a change to the user's behavior and/or actions that the user is already performing (e.g., actions that, when continued, will improve the user's health). In certain embodiments, the control system 102 may determine the actions in response to a determination that the user is generally unhealthy and/or in response to the comparison a health to a threshold, as described in reference to block 504.

At block 508, the control system 102 may provide, via a device of the user, a notification indicative of the actions configured to improve the user's health. For example, the notification may be similar to the notification 300 of FIG. 3 and may generally display the actions for viewing and/or selection by the user. In certain embodiments, the control system 102 may automatically perform actions and notify the user of the performed actions.

Figure 6:
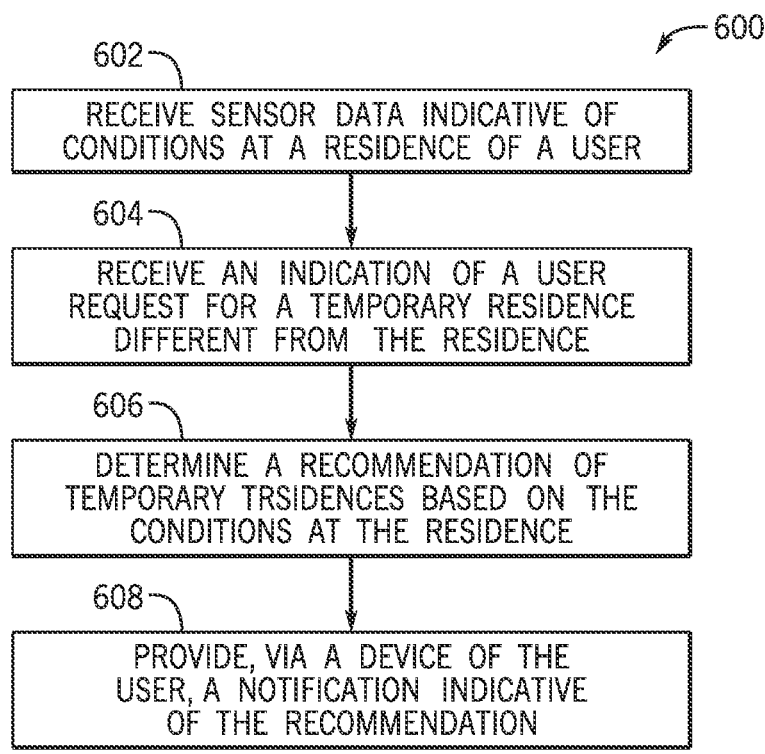
FIG. 6 illustrates a flow chart of a method for determining a recommendation of temporary residences for a user using the health management system of FIG. 1, in accordance with embodiments described herein.

FIG. 6 illustrates a flow chart of a method 600 for determining a recommendation of temporary residences for a user using the control system 102 of FIG. 1. The following description of the method 600 will be described as being performed by the control system 102, but it should be noted that any suitable processor-based device may be specially programmed to perform any of the methods described herein. Moreover, although the following description of the method 600 is described as including certain steps performed in a particular order, it should be understood that the steps of the method 600 may be performed in any suitable order, that certain steps may be omitted, and/or that certain steps may be added.

At block 602, the control system 102 may receive sensor data indicative of conditions at the residence 104 of a user. For example, the control system 102 may receive the sensor data from some or all of the sensors 106 disposed at the residence 104. At block 604, the control system 102 may receive a user request for a temporary residence that is different from the residence 104. For example, the user may be planning a vacation or trip to a particular destination and may be trying to find a temporary residence at the destination.

At block 606, the control system 102 may determine a recommendation of temporary residences (e.g., at least one temporary residence) based on the conditions at the residence 104. For example, the control system 102 may identify, from a larger pool of temporary residences, the temporary residences having conditions similar to or the same as the conditions at the residence 104. In certain embodiments, the conditions may facilitate a healthy lifestyle of the user. By way of specific example, the temporary residences may have the same bed type and/or the same exercise equipment as the conditions at the residence 104, thereby facilitating sufficient sleep by the user and/or exercise by the user. In some embodiments, the control system 102 may identify temporary residences having conditions with additional health benefits, such as a bed that is better than the beds 170 of the residence 104 and/or additional recreational equipment that is not present at the residence 104.

At block 608, the control system 102 may provide, via a device of the user, a notification indicative of the recommendation of temporary residences. For example, the notification may be similar to the notification 300 of FIG. 3 and may generally display the temporary residences (e.g., list the temporary residences, show locations of the temporary residences via a map, show images of the interior and/or exterior of the temporary residences). In certain embodiments, the control system 102 may automatically book a particular temporary residence and/or may notify the user of the booking. In some embodiments, the control system 102 may book the particular temporary residence in response to a user selection of the particular temporary residence.

Furthermore, the control system 102 may adjust (e.g., decrease) an insurance cost for the user associated with the residence 104 in response to the user selecting one of the recommended temporary residences. In some cases, the control system 102 may use the user selection of one of the recommended temporary residences as one input into an algorithm to calculate the insurance cost for the user associated with the residence 104 (e.g., as one input, in addition to other sensor data). In this way, for each instance in which the user selects one of the recommended temporary residences (e.g., instead of another temporary residence) in an effort to improve their health, the user may receive a financial benefit in terms of the insurance cost. The techniques related to the temporary residence may also be applied to assist the user in a search for a new permanent residence. For example, the control system may provide a recommendation for a new permanent residence that includes certain health-supporting features of a current residence of the user.

Figure 7:
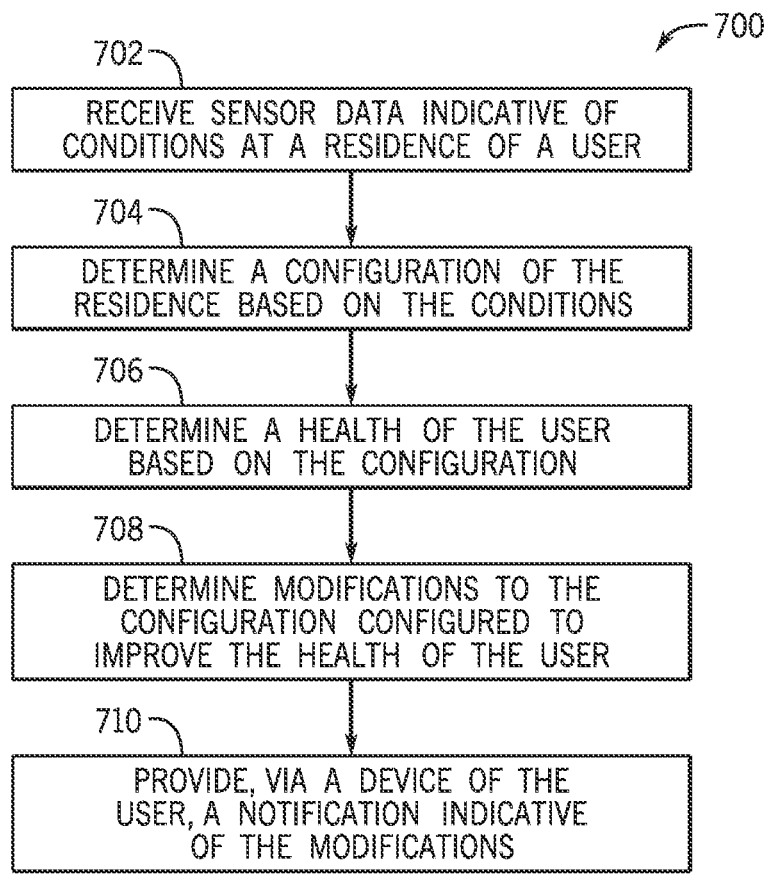
FIG. 7 illustrates a flow chart of a method for determining modifications to a configuration of a user's residence using the health management system of FIG. 1, in accordance with embodiments described herein.

FIG. 7 illustrates a flow chart of a method 700 for determining modifications to a configuration of the residence 104 using the control system 102 of FIG. 1. The following description of the method 700 will be described as being performed by the control system 102, but it should be noted that any suitable processor-based device may be specially programmed to perform any of the methods described herein. Moreover, although the following description of the method 700 is described as including certain steps performed in a particular order, it should be understood that the steps of the method 700 may be performed in any suitable order, that certain steps may be omitted, and/or that certain steps may be added.

At block 702, the control system 102 may receive sensor data indicative of conditions at the residence 104 of a user. For example, the control system 102 may receive the sensor data from some or all of the sensors 106 disposed at the residence 104. At block 704, the control system 102 may determine a configuration of the residence based on the conditions at the residence 104. For example, the configuration may include a general status of certain components disposed at the residence 104, such as cleaning supplies, appliances, structural features of the residence 104 (e.g., doors, walls, ceilings, floors), light fixtures, furniture, exterior surfaces of the residence 104 (e.g., outside walls, a roof), and other suitable components at the residence 104. The status of the components included in the configuration may include a location, an age, an amount of wear, a working status (e.g., working efficiently, working inefficiently, broken, repaired), and/or the presence, type, and/or severity of defects.

At block 706, the control system 102 may determine a health of the user based on the configuration of the residence 104. For example, the configuration may affect (e.g., positively affect, negatively affect) the user's health, such as by affecting the user's weight, stress level, concentration, and other health parameters. At block 708, the control system 102 may determine modifications to the configuration that are configured to improve the user's health. For example, the modifications may include performing a maintenance operation for an appliance, changing a location of cleaning supplies, maintaining a lawn, and other suitable modifications.

At block 708, the control system 102 may provide, via a device of the user, a notification indicative of the modifications to the configuration. For example, the notification may be similar to the notification 300 of FIG. 3 and may generally display the modifications for viewing and/or selection by the user. In certain embodiments, the control system 102 may automatically perform modifications and notify the user of the performed modifications.

Accordingly, the control system of the health management system described herein may facilitate determining actions configured to improve a user's health, determining a recommendation of temporary residences for a user based on conditions at the user's residence (e.g., permanent residence), and determining modifications to a configuration of the user's residence that are configured to improve the user's health. The user may be notified of the actions, recommendation of temporary residences, and/or modifications, thereby enabling the user to improve their health via the actions, temporary residences, and modifications. The control system may automatically perform the actions, book a particular temporary residence, and implement the modifications, such as independent of user interaction, thereby improving the user's health without interaction from the user. Additionally, the control system may adjust an insurance cost based on conditions at the user's residence and/or based on changes to the user's health. For example, based on the user performing certain recommended actions, the control system may determine a corresponding improvement in the user's health and decrease an insurance cost associated with the user based on the improvement. Accordingly, the control system described herein may facilitate improvements to a user's health and facilitate managing insurance costs associated with the user.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. It should be appreciated that any of the features and embodiments described herein may be combined in any suitable manner. Furthermore, it should be appreciated that the control system may utilize the sensor data and various other types of data (e.g., accessed from one or more databases and/or third-party data sources; input by the user) to make the recommendations and to carry out the other techniques disclosed herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A health management system comprising:
one or more sensors disposed at a residence and configured to obtain sensor data indicative of one or more conditions at the residence; and
one or more processors configured to:
receive the sensor data from the one or more sensors;
identify a user profile associated with a user at the residence by comparing the sensor data with a user profile database, wherein the user profile database comprises a plurality of user profiles associated with a plurality of users;
determine a health of the user based on the user profile associated with the user and the one or more conditions;
determine one or more actions configured to improve the health of the user based on the user profile associated with the user and the one or more conditions, wherein the one or more actions comprise blocking access of the user to one or more portions of the residence, and wherein the one or more portions are associated with one or more objects that are deemed inappropriate to the user based on the user profile associated with the user;
automatically instruct a device to perform at least one of the one or more actions, wherein the device comprises a lock configured to block the access of the user to the one or more portions of the residence;
receive additional sensor data indicative of one or more updated conditions at the residence, wherein the one or more updated conditions are indicative of completion of the at least one of the one or more actions;
determine an occurrence of a change in the health of the user based on the additional sensor data; and
adjust an insurance cost for an insurance policy of the residence based on the occurrence of the change in the health of the user.

2. The health management system of claim 1, wherein the plurality of users is grouped together and associated with the insurance policy, and wherein the one or more processors are configured to:
determine a respective occurrence of a respective change in a respective health of a second user of the plurality of users based on the occurrence of the change in the health of the user; and
adjust the insurance cost for the insurance policy of the residence based on the respective occurrence of the respective change in the respective health of the second user.

3. The health management system of claim 1, wherein the one or more sensors comprise one or more scales configured to weigh an amount of one or more foods at the residence.

4. The health management system of claim 3, wherein the one or more actions comprise a first action to decrease consumption of a first type of food of the one or more foods, a second action to increase consumption of a second type of food of the one or more foods, or both.

5. The health management system of claim 1, wherein the one or more conditions comprise one or more locations of one or more cleaning supplies at the residence, one or more types of the one or more cleaning supplies, one or more amounts of the one or more cleaning supplies, or a combination thereof.

6. The health management system of claim 1, wherein the one or more actions comprise adjusting the lock to a locked position based on the user profile being associated with a child as the user, wherein the lock is configured to block the access of the child to the one or more portions of the residence associated with cleaning supplies.

7. The health management system of claim 1, wherein each of the plurality of user profiles comprises an age, a height, a weight, and medical history associated with a respective user.

8. The health management system of claim 1, wherein the one or more processors are configured to:
determine recreational conditions associated with the user at the residence based on the sensor data, wherein the recreational conditions comprise performance of recreational activities at the residence, movement of recreational equipment at the residence, or a combination thereof; and
determine the health of the user based on the recreational conditions associated with the user.

9. The health management system of claim 1, wherein the one or more processors are configured to instruct the one or more sensors to turn off in response to determining the one or more actions.

10. The health management system of claim 1, wherein the one or more processors are configured to:
provide, via an output device of the user, a notification indicative of the one or more actions; and
upon receiving a user input indicative of the user selecting a selected action from the one or more actions:
automatically instruct the device to perform the selected action as the at least one of the one or more actions.

11. A health management system comprising:
one or more sensors disposed at a residence and configured to obtain sensor data indicative of one or more conditions at the residence; and
one or more processors configured to:
receive the sensor data from the one or more sensors;
determine a configuration of the residence based on the one or more conditions, wherein the configuration comprises a status of one or more components at the residence;
identify a user profile associated with a user by comparing the sensor data with a user profile database, wherein the user profile database comprises a plurality of user profiles associated with a plurality of users;
determine a health of the user based on the user profile associated with the user and the configuration;
determine one or more modifications to the configuration that are configured to improve the health of the user, wherein the one or more modifications comprise blocking access of the user to one or more portions of the residence, and wherein the one or more portions are associated with one or more objects that are deemed inappropriate to the user based on the user profile associated with the user;
automatically instruct a device of the one or more components to execute at least one of the one or more modifications, wherein the device comprises a lock configured to block the access of the user to the one or more portions of the residence;
receive additional sensor data indicative of one or more updated conditions at the residence;
determine an updated configuration of the residence based on the one or more updated conditions, wherein the updated configuration comprises an updated status of the device of the one or more components and is indicative of completion of the at least one of the one or more modifications;

determine an occurrence of a change in the health of the user based on the additional sensor data; and
adjust an insurance cost for an insurance policy of the residence based on the occurrence of the change in the health of the user.

12. The health management system of claim 11, wherein the one or more processors are configured to automatically instruct the lock of the device of the one or more components to adjust to a locked position to block the access of the user to the one or more portions of the residence as the at least one modification of the one or more modifications in response to determining the one or more modifications.

13. The health management system of claim 11, wherein the at least one modification comprises turning off one or more appliances, locking one or more rooms, locking one or more cabinets, or a combination thereof.

14. The health management system of claim 11, wherein the plurality of users is grouped together and associated with the insurance policy, and wherein the one or more processors are configured:
determine a respective occurrence of a respective change in a respective health of a second user of the plurality of users based on the occurrence of the change in the health of the user; and
adjust the insurance cost for the insurance policy of the residence based on the respective occurrence of the respective change in the respective health of the second user.

15. The health management system of claim 11, wherein the configuration comprises a noise level of an appliance at the residence, and the one or more processors are configured to determine that the one or more modifications comprise a maintenance operation for the appliance in response to the noise level exceeding a threshold level.

16. The health management system of claim 11, wherein the configuration comprises a maintenance status of an outdoor area at the residence, and the health of the user comprises a stress level associated with the maintenance status.

17. The health management system of claim 11, wherein the one or more sensors comprise one or more cameras to capture imagery as one or more still images, one or more videos, or both, at the residence.

18. The health management system of claim 11, wherein each of the plurality of user profiles comprises an age, a height, a weight, and medical history associated with a respective user.

19. The health management system of claim 11, wherein the one or more processors are configured to:
determine recreational conditions associated with the user at the residence based on the sensor data, wherein the recreational conditions comprise performance of recreational activities at the residence, movement of recreational equipment at the residence, or a combination thereof; and
determine the health of the user based on the recreational conditions associated with the user.

20. The health management system of claim 11, wherein the one or more processors are configured to:
provide, via an output device of the user, a notification indicative of the one or more modifications to the configuration; and
upon receiving a user input indicative of the user selecting a selected modification from the one or more modifications to the configuration:

automatically instruct the device of the one or more components to execute the selected modification as the at least one of the one or more modifications.

* * * * *